United States Patent
Kripac et al.

(10) Patent No.: US 8,914,259 B2
(45) Date of Patent: Dec. 16, 2014

(54) PASSIVE ASSOCIATIVITY IN THREE-DIMENSIONAL (3D) MODELING

(75) Inventors: Jiri Kripac, Fairfax, CA (US);
Hans-Frederick Brown, Montreal (CA);
Pei Zhan, Ada, MI (US)

(73) Assignee: Autodesk, Inc., San Rafael, CA (US)

(*) Notice: Subject to any disclaimer, the term of this patent is extended or adjusted under 35 U.S.C. 154(b) by 550 days.

(21) Appl. No.: 13/270,078

(22) Filed: Oct. 10, 2011

(65) Prior Publication Data

US 2012/0089374 A1 Apr. 12, 2012

Related U.S. Application Data

(60) Provisional application No. 61/392,383, filed on Oct. 12, 2010.

(51) Int. Cl.
*G06F 17/50* (2006.01)
*G06T 17/30* (2006.01)
*G06T 19/20* (2011.01)

(52) U.S. Cl.
CPC ............... *G06T 17/30* (2013.01); *G06T 19/20* (2013.01); *G06T 2219/2021* (2013.01)
USPC .............................................. 703/1; 345/420

(58) Field of Classification Search
CPC . G06F 17/50; G06F 17/5086; G06F 2217/02; G06F 2217/06; G06T 19/00; G06T 19/20; G06T 17/00; G06T 17/10; G06T 17/30; G06T 2219/20
USPC .......................................................... 703/1
See application file for complete search history.

(56) References Cited

U.S. PATENT DOCUMENTS

| | | | | |
|---|---|---|---|---|
| 5,119,309 | A * | 6/1992 | Cavendish et al. | 700/182 |
| 6,204,860 | B1 | 3/2001 | Singh | |
| 6,384,849 | B1 | 5/2002 | Morcos et al. | |
| 6,628,279 | B1 | 9/2003 | Schell et al. | |
| 6,639,592 | B1 | 10/2003 | Dayanand et al. | |
| 6,985,793 | B2 * | 1/2006 | Landers et al. | 700/182 |
| 7,196,702 | B1 * | 3/2007 | Lee et al. | 345/419 |
| 7,571,079 | B2 * | 8/2009 | Chin et al. | 703/2 |
| 7,733,340 | B1 * | 6/2010 | Desimone et al. | 345/420 |
| 7,814,441 | B2 | 10/2010 | Bae et al. | |
| 8,305,376 | B2 * | 11/2012 | Ran et al. | 345/420 |
| 2011/0025688 | A1 * | 2/2011 | Schneider et al. | 345/420 |

OTHER PUBLICATIONS

Lombard, Matt, "SolidWorks 2010 Bible", Chapters 1, 3, 4, 6, 7, 10, 27, 30, Published Apr. 12, 2010.*
Tornincasa et al, "The Future and Evolution of CAD", 14th International Research/Expert Conference, Sep. 11-18, 2010.*

(Continued)

*Primary Examiner* — Mary C Jacob
(74) *Attorney, Agent, or Firm* — Gates & Cooper LLP

(57) ABSTRACT

A method, system, apparatus, article of manufacture, and computer-readable storage medium provide the ability to edit surface objects in a surface modeler. A dependent surface object (that is dependent on one or more input objects) having one or more properties is obtained. First user input is received that indicates that a surface associativity for the dependent surface object is off. In response to the receiving, an association between the dependent surface object and the one or more input objects is maintained. The association is used to expose the one or more properties of the dependent surface object. The properties are then displayed for editing by the user.

15 Claims, 13 Drawing Sheets

(56) References Cited

OTHER PUBLICATIONS

Samuel et al, "Basic and Intermediate NX4 Modeling, Drafting and Assemblies", Design Visionaries, 2006, pp. 26-27, 35-37, 120-129, 262-263, 268, 293-294.*

Lee et al, "A Parametric Surface Blending Method for Complex Engineering Objects", 2nd ACM Solid Modeling, 1993.*

Surface Molding, Chapter 15, solidworks—2003.

Instant Mayer for Windows, Irix and Linux, 2002, Alias Wavefront, a division of Silicon Graphics Limited.

Ma, Y.S., et al., "Associative feature modeling for concurrent engineering integration", School of Mechanical and Production Engineering, Nanyang Technological University, 50 Nanyang Avenue, Singapore 639798, Singapore, Computers in Industry, 51 (2003), 51-71.

* cited by examiner

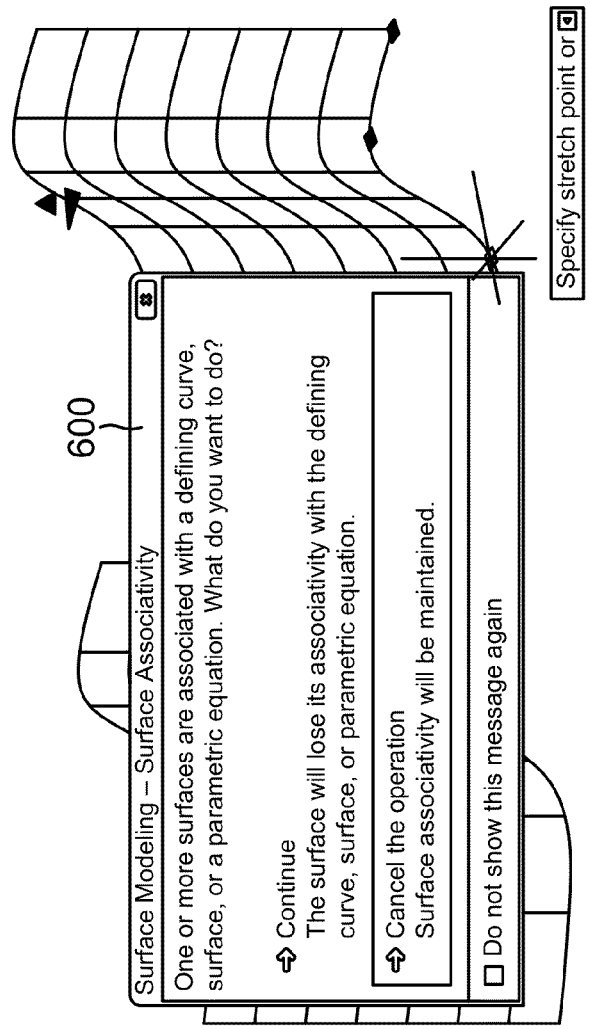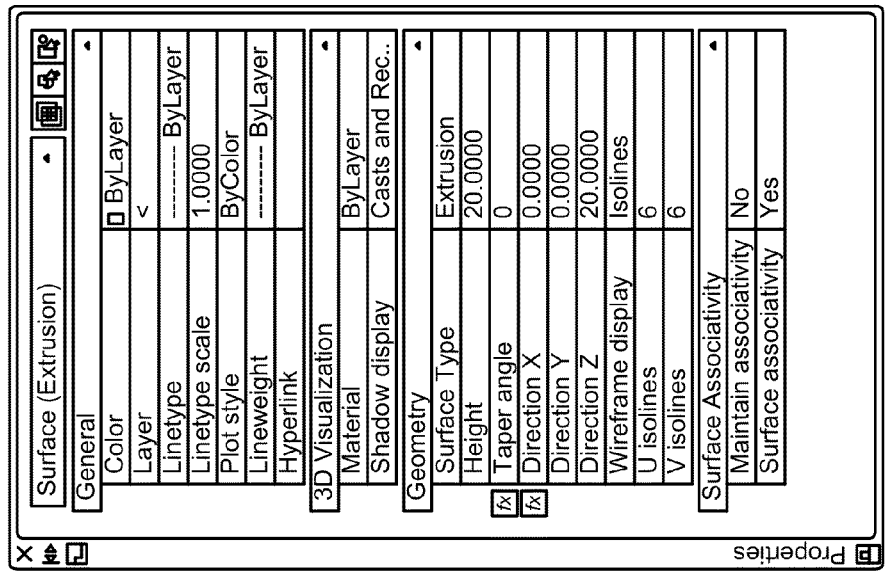
FIG. 6

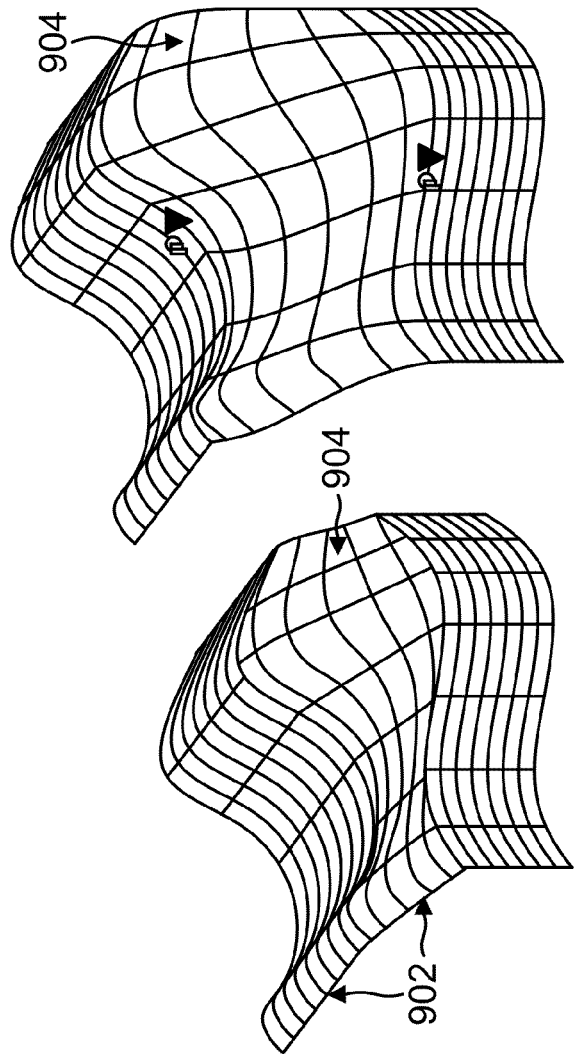
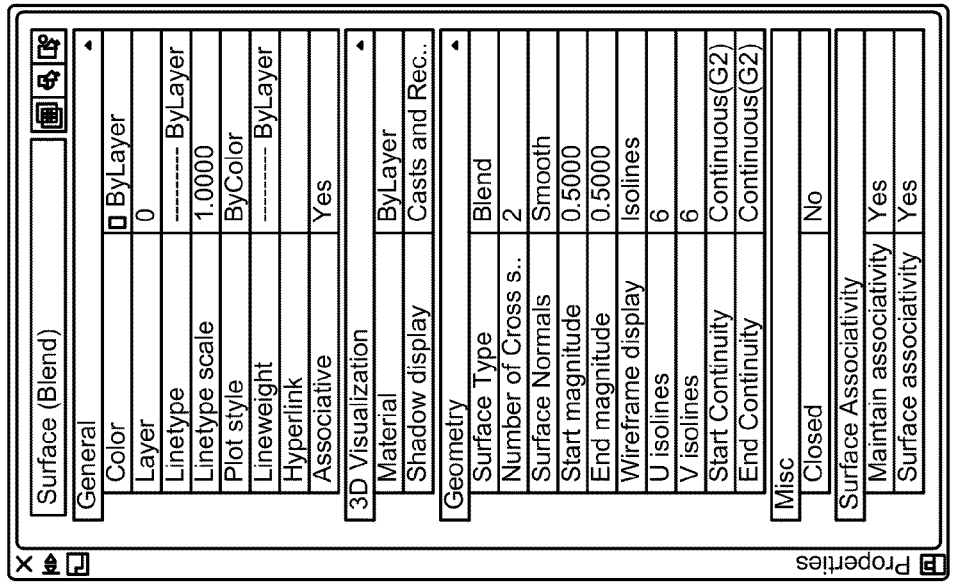
FIG. 11

PASSIVE ASSOCIATIVITY IN THREE-DIMENSIONAL (3D) MODELING

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 61/392,383, filed on Oct. 12, 2010, by Jiri Kripac, Hans-Frederick Brown, and Pei Zhan, entitled "FRICTION-LESS SURFACE MODELING ENVIRONMENT".

This application is related to the following co-pending and commonly-assigned U.S. patent application(s), which is/are incorporated by reference herein:

Utility patent application Ser. No. 13/270,087, filed on the same date herewith, by Hans-Frederick Brown, entitled "EXPANDABLE GRAPHICAL ACCORDANCES," which application claims priority to Provisional Application Ser. No. 61/392,383, filed on Oct. 12,2010, by Jiri Kripac, Hans-Frederick Brown, and Pei Zhan, entitled "FRICTION-LESS SURFACE MODELING ENVIRONMENT".

BACKGROUND OF THE INVENTION

1. Field of the Invention

The present invention relates generally to computer graphics, and in particular, to a method, apparatus, and article of manufacture for three-dimensional (3D) surface modeling applications and passively associating surfaces with each other.

2. Description of the Related Art

In computer-aided design (CAD) drawing applications, parametric/associative surface models consists of a (possibly large) collection of individual surface objects. The surface objects may depend on each other or depend on other objects or parameters. A common way a surface may become dependent on other objects is when it is created using geometry of the other objects (referred to herein as related surfaces/geometry/objects). An example is a blend surface that is created by selecting two edges of two other surfaces, or an offset surface that is created by offsetting another surface.

In some scenarios, it is desirable for the surfaces to keep their relations and let the system automatically preserve these relations and update all related surfaces when some surfaces are edited. In other scenarios, it is more desirable not to maintain these relations and treat the surfaces as individual unrelated surfaces, to avoid unintended change propagations. However, even if the relations between the surfaces are not maintained, it is desirable to be able to edit as many parameters of the surface as possible. For example it is desirable to be able to edit the blend surface continuity (G0-positional, G1-tangential, G2-curvature) or the offset surface distance, even if from the user's point of view the edited surface does not maintain any relation with the surfaces it has been created from. Such problems may be better understood with a description of solid modeling and the management of relations in such models.

Most traditional solid modelers are based on feature driven modeling operations where two-dimensional (2D) sketches are extruded/revolved/lofted and each subsequent feature is built on the previous feature. These modeling operations are usually displayed to the user in a tree structure (feature history tree) and edit operations must follow the hierarchical order of the tree. In addition, most of the parametric data is entered via dialogs during the creation process and subsequent modifications are summoned from the feature tree.

Simpler solid modelers work directly on the B-REP (boundary representation) and modeling operations are not tracked or maintained in a parametric/history tree. These type of modelers usually let the user tweak vertex/edge/faces of a solid without any sort of constraints. This modeling paradigm is useful when working with imported models or complex native models. Further, such simple modelers usually let the user modify vertex/edge/face via either dialog or move/rotate/scale graphic affordances directly in the canvas.

More recently a new "synchronous" technology was introduced that permits one to blend the advantage of the traditional features like solid modeling with some of the direct modeling advantages. The users are also presented with a "Feature Tree" browser but the features are auto detected by analyzing the model itself—thus providing greater flexibility and not relying on a linear succession of modeling operations. Further, in most cases, the user is presented with graphic affordances directly in the canvas that relates to the parametric property being edited or detected.

On the other hand, most surface modelers are either pure NURBS (non-uniform rational b-spline) modelers where all operations result in a NURBS surface or are solid modeling disguised as surface modelers. In the latter case surfaces are considered "bodies" and any of the previous modeling paradigms are used on them (e.g., feature driven, direct, synchronous, etc.).

Some of the pure NURBS modelers have implemented their own associative engines that track underlying creation geometry (e.g., 2D/3D [three-dimensional] sketches) and some of the edit operations (e.g., trimming/blending surfaces). The associative actions are sometimes displayed in a scene graph (i.e., similar to a history tree) and nodes have a limited editing capability. Further, most of the surface edits are made directly on the surface using various widgets/gizmos (e.g., move/scale/rotate) that control the location of control vertices on the UV hull/texture map.

In summary, with prior art 3D surface modeling, surface objects can either be related or not related to each other. If related, a surface object is associative and depends on properties of "other surfaces." If the "other surfaces" change, the dependent surface automatically updates. Similarly, non-associative surfaces have no relation to surfaces that the non-associative surface was created from. However, because such a surface is non-associative, if the "other surface" is modified, the non-associative surface does not automatically update. Further, the non-associative surface does not maintain any history or knowledge base of the surfaces used to create it. Thus, the user has no option to retain an "associative/relation" knowledge base and limits the capabilities of the user to actively determine the behavior of a surface.

SUMMARY OF THE INVENTION

Embodiments of the invention overcome the problems of the prior art by enabling a passive associativity state. In this regard, the state of individual surface objects may be "associative", "non-associative" or "passively associative". The "passively associative" state is the innovation not present in other modeling systems.

If the state of the surface is associative, it may depend on other objects. When the other objects change, the associative surface automatically updates to maintain its relation with the objects it depends on.

If the state of the surface is non-associative, the surface does not keep any dependencies on other objects. A non-associative surface does not automatically update when the other objects change.

If the state of the surface is "passively associative", the surface behaves as a non-associative surface, i.e. it does not automatically update if the objects it depends on change. However, the surface does keep dependencies on other objects and uses this information to expose additional properties of the surface.

For example, if a blend surface is "passively associative", it exposes its continuity properties (G0, G1, G2) with the surfaces it was created from. It is possible to edit these continuity properties of the blend surface and the blend surface properly updates, honoring the continuity. The "passively associative" offset surface exposes its offset distance property. It is possible to edit this offset distance property and the offset surface properly updates.

The additional surface properties are exposed only when the "passively associative" surface keeps the same geometric relations with the surfaces it has been created from. If the "passively associative" surface or the other surfaces change so that these geometric relations are broken, the "passively associative" surface becomes non associative and loses these additional properties. For example, when the surfaces that the blend surface has been created from change shape or position so that the edges of the blend surface no longer touch edges of the other surfaces, the "passively associative" blend surface becomes a regular loft surface and loses its continuity properties. When the shape of the surface the offset surface has been created from changes, the "passively associative" offset surface becomes a regular generic surface, losing its offset property. However, if both the "passively associative" surface and the objects it depends on are all changed the same way, such as translated, rotated, scaled or mirrored, so that the geometric relations are preserved, the "passively associative" state of the surface is also preserved.

BRIEF DESCRIPTION OF THE DRAWINGS

Referring now to the drawings in which like reference numbers represent corresponding parts throughout:

FIG. 6 illustrates a dialog box displayed to the user when a user attempts to modify a property that would cause a loss in associativity in accordance with one or more embodiments of the invention;

FIG. 11 illustrates the movement of an existing input surface and the resulting updated blend surface in accordance with one or more embodiments of the invention;

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Prior art solid/surface creation/surface modeling paradigms may exhibit one or more of the following properties:

Are mostly created/modified through dialogs;

Some modelers use industry standard gizmo manipulators (e.g., move, scale, and rotate) to modify features, objects or components;

Recent modelers have developed a set of manipulators for specific geometry properties and these are displayed when features or sub-components are selected;

Recent modelers expect that when a feature or sub-component is selected the user is expected to modify the parametric properties thus always displaying the graphic manipulators;

Are directly taken from the solid modeling world and do not take in account the specific-nesting (multi patchwork representation instead of a body) of the surface modeling operations;

Are difficult to control or predict when associative engines are introduced with multiple body interaction (multi patchwork in the case of surfaces);

Somewhat limits the user's edit operations when associative engines are activated; and Potential parametric data (continuity conditions/bulge magnitude) are lost when the user deactivates the associative engine.

Embodiments of this invention provide a friction-less surface modeling paradigm where the user can benefit from the associative engine and its parametric data without being limited in his surface edits. In this regard, embodiments are "friction-less" because the ability to learn and utilize the new "passive-associative" state of a surface object is simple, does not create deleterious effects, and does not limit the user's ability to perform surface edits.

In addition to the above, the associative engine express itself directly in the object type properties and the usage of a tree or graph system is not required.

Further, in the case where the user wants to enforce the associative relations, then visual cues may be provided to notify the user of the constraints when necessary. Visual cues may also be displayed when equations/expressions are controlling certain parametric data.

Hardware Environment

Figure 1:
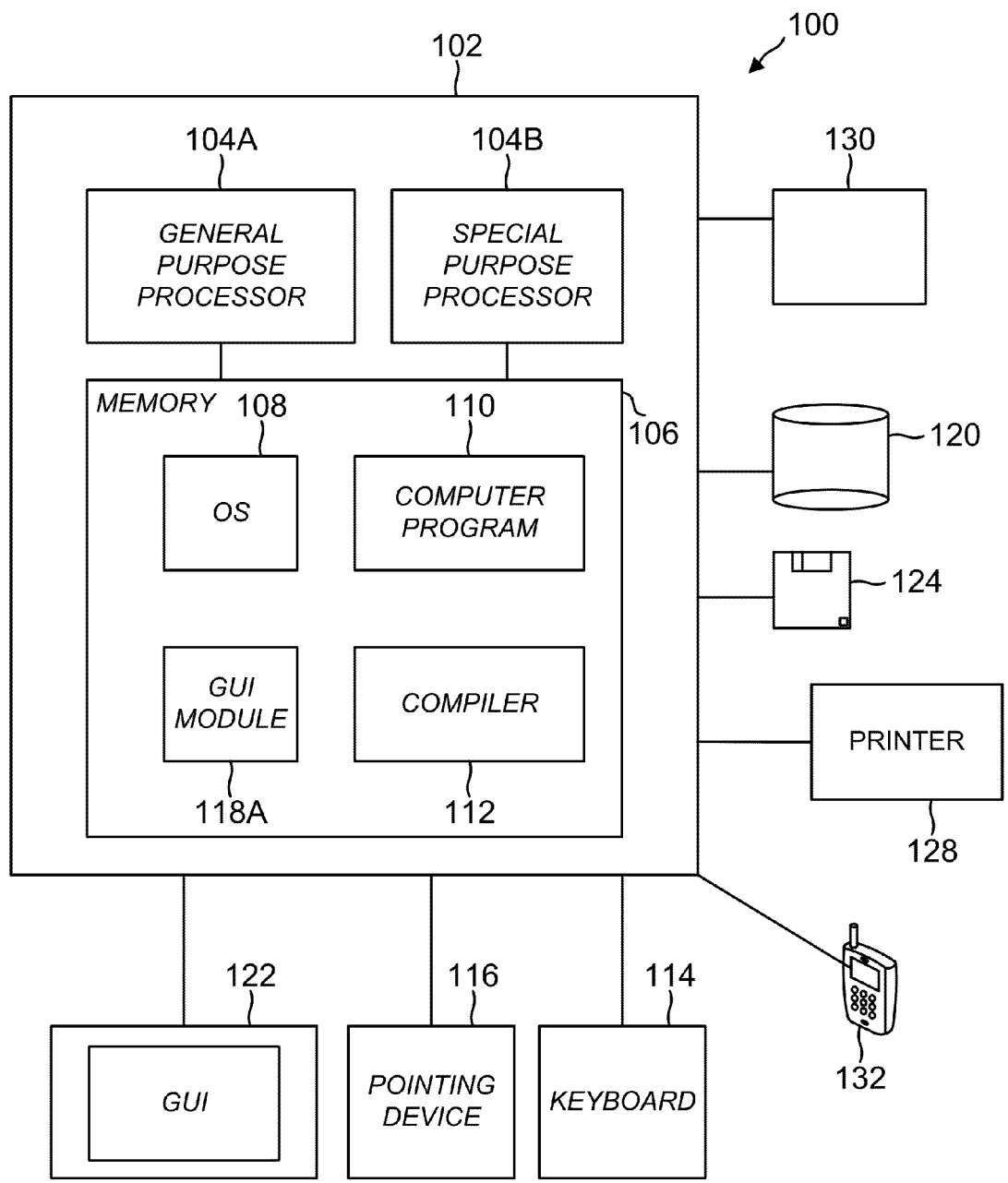
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to or integrated with other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to or may comprise a portable or media viewing/listening device 132 (e.g., an MP3 player, iPod™, Nook™, portable digital video player, cellular device, personal digital assistant, etc.).

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108 to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118A. Although the GUI module 118A is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of a multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 102 may also implement a compiler 112 which allows an application program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that was generated using the compiler 112.

The computer 102 also optionally comprises an external communication device such as a modem, satellite link, Ethernet card, or other device for accepting input from and providing output to other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program instructions which, when accessed, read and executed by the computer 102, causes the computer 102 to perform the steps necessary to implement and/or use the present invention or to load the program of instructions into a memory, thus creating a special purpose data structure causing the computer to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 102.

Figure 2:
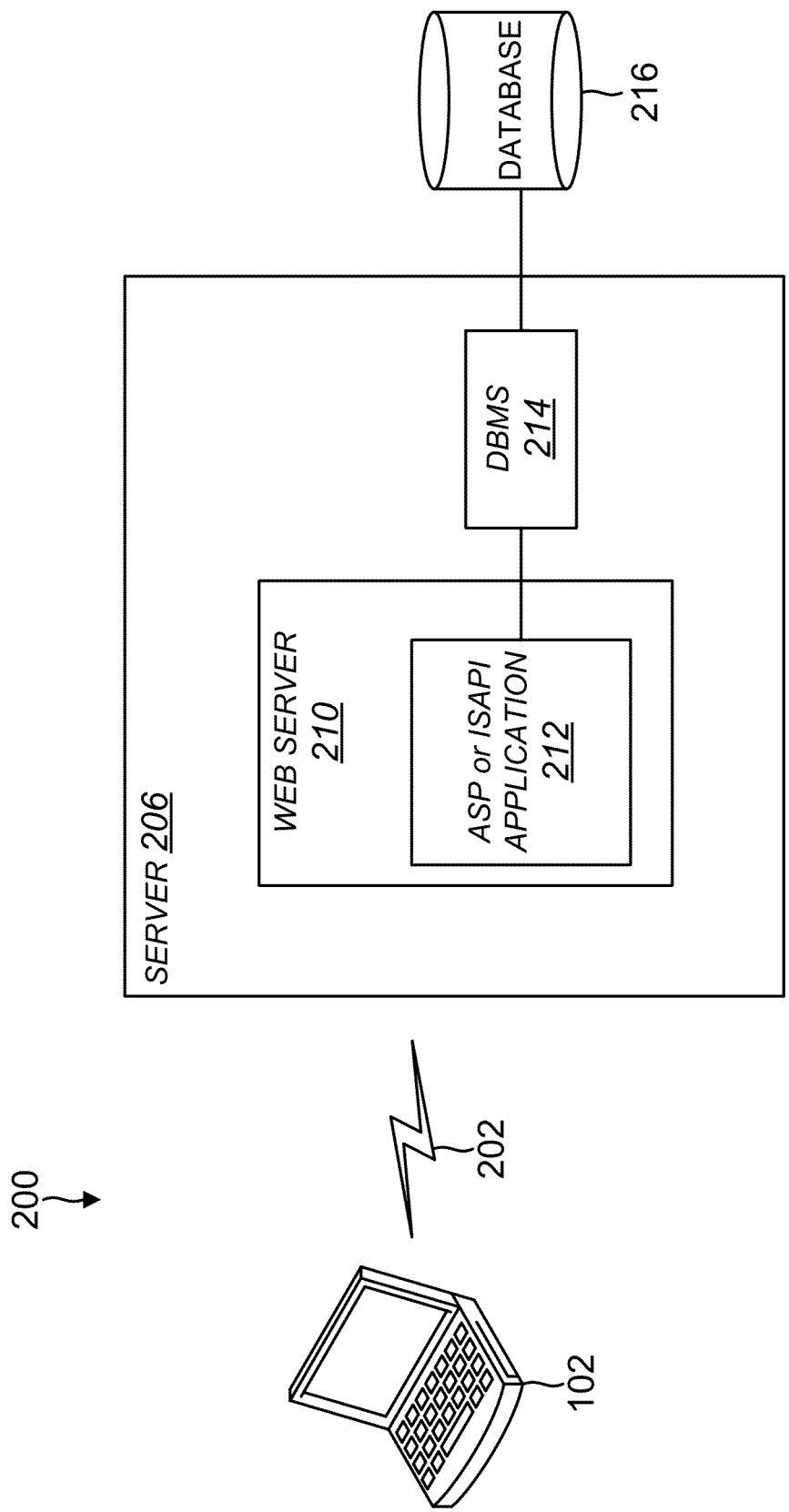
FIG. 2 schematically illustrates a typical distributed computer system using a network to connect client computers to server computers in accordance with one or more embodiments of the invention.

FIG. 2 schematically illustrates a typical distributed computer system 200 using a network 202 to connect client computers 102 to server computers 206. A typical combination of resources may include a network 202 comprising the Internet, LANs (local area networks), WANs (wide area networks), SNA (systems network architecture) networks, or the like, clients 102 that are personal computers or workstations, and servers 206 that are personal computers, workstations, minicomputers, or mainframes (as set forth in FIG. 1).

A network 202 such as the Internet connects clients 102 to server computers 206. Network 202 may utilize ethernet, coaxial cable, wireless communications, radio frequency (RF), etc. to connect and provide the communication between clients 102 and servers 206. Clients 102 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, etc. Further, the software executing on clients 102 may be downloaded from server computer 206 to client computers 102 and installed as a plug in or ACTIVEX™ control of a web browser. Accordingly, clients 102 may utilize ACTIVEX™ components/component object model (COM) or distributed COM (DCOM) components to provide a user interface on a display of client 102. The web server 210 is typically a program such as MICROSOFT'S INTERNENT INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of or connected directly to client 102 instead of communicating/obtaining the information from database 216 across network 202. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the term "user computer", "client computer", and/or "server computer" is referred to herein, it is understood that such computers 102 and 206 may include thin client devices with limited or full processing capabilities, portable devices such as cell phones, notebook computers, pocket computers, multi-touch devices, and/or any other device with suitable processing, communication, and input/output capability.

Of course, those skilled in the art will recognize that any combination of the above components, or any number of different components, peripherals, and other devices, may be used with computers 102 and 206.

Detailed Description of Passive-Associative Functionality

Embodiments of the invention are implemented as a software application on a client 102 or server computer 206. Such a software application may comprise a computer-aided design (CAD) application (e.g., AutoCAD™ available from the assignee of the present application).

As described above, embodiments of the invention utilize a passive associative feature for surface objects. With such functionality, even if a user elects to have a surface object be non-associative, an associative engine (i.e., within the software application) may maintain the relations internally and does not convert the object into a non-associative object unless necessary. Further, properties of the surface may be exposed based on such relations.

For example, a user may view and modify additional properties of a passive associative blend surface. Such additional properties may only be shown if the geometric conditions of the passive associative blend surface and the original input surface has not been changed. For example, if the passive associative blend surface still touches the original input surface, the additional properties may be displayed by the user. However, if either surface has been moved away (i.e., the passive-associative blend surface or one of the input surfaces on which it depends), the additional properties may be removed. Once the additional properties are removed, if an input surface is moved, the blend surface (dependent upon such an input surface) may not automatically update because it doesn't touch the input surface anymore. However, if all three surfaces are moved (i.e., the blend surface and the two input surfaces), the continuity/dependency between the passive associative blend surface and input surfaces has not been changed, and the additional properties may still be maintained.

Embodiments of the invention provide the ability for the user to state whether a surface is associative or passive associative. Thus, if the user labels a surface as associative, all updates will occur automatically without additional user input when an input surface is modified. However, with a passive associative surface, updates will not occur automatically but the additional properties may still be maintained. Prior art modeling applications do not provide the option to maintain/expose additional properties as with the passive associative capabilities of the present invention. Instead, prior art implementations are limited to associative and non-associative surfaces. Accordingly, there is no mechanism to request input from a user to determine if the user desires to break an association between two surfaces once/after the user has labeled a surface "non-associative" and later attempts to move such a non-associative or input surface.

The properties and operation of the passive associative functionality of the present invention may be better understood with figures that illustrates the different behaviors and settings that may be provided.

Figure 3:
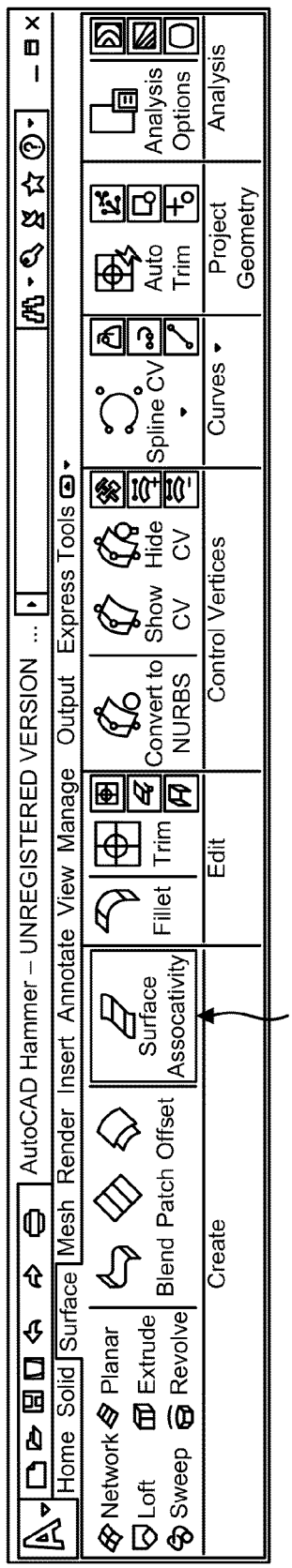
FIG. 3 illustrates a toolbar that displays an icon/button that can be used to turn on/off surface associativity in accordance with one or more embodiments of the invention.

A user can either create or edit surfaces with a "Surface Associativity" functionality On/Off. FIG. 3 illustrates a toolbar that displays an icon/button 302 that can be used to turn on/off surface associativity in accordance with one or more embodiments of the invention. When a surface object is created, each creation action generates a specific surface type. Examples of some surface types that may be created include planar surface, loft surface, revolve surface, sweep surface, extruded surface, network surface, blend surface, fillet surface, chamfer surface, offset surface, and patch surface. Each of these surface objects will share the same object properties when the associative engine is "on" or "off" but some of the visual cues and interaction will be different. In accordance with embodiments of the invention, if the user elects to have surface associativity off, the surface is passive associative.

Surface Types Created from 2D/3D Profiles

Figure 4:
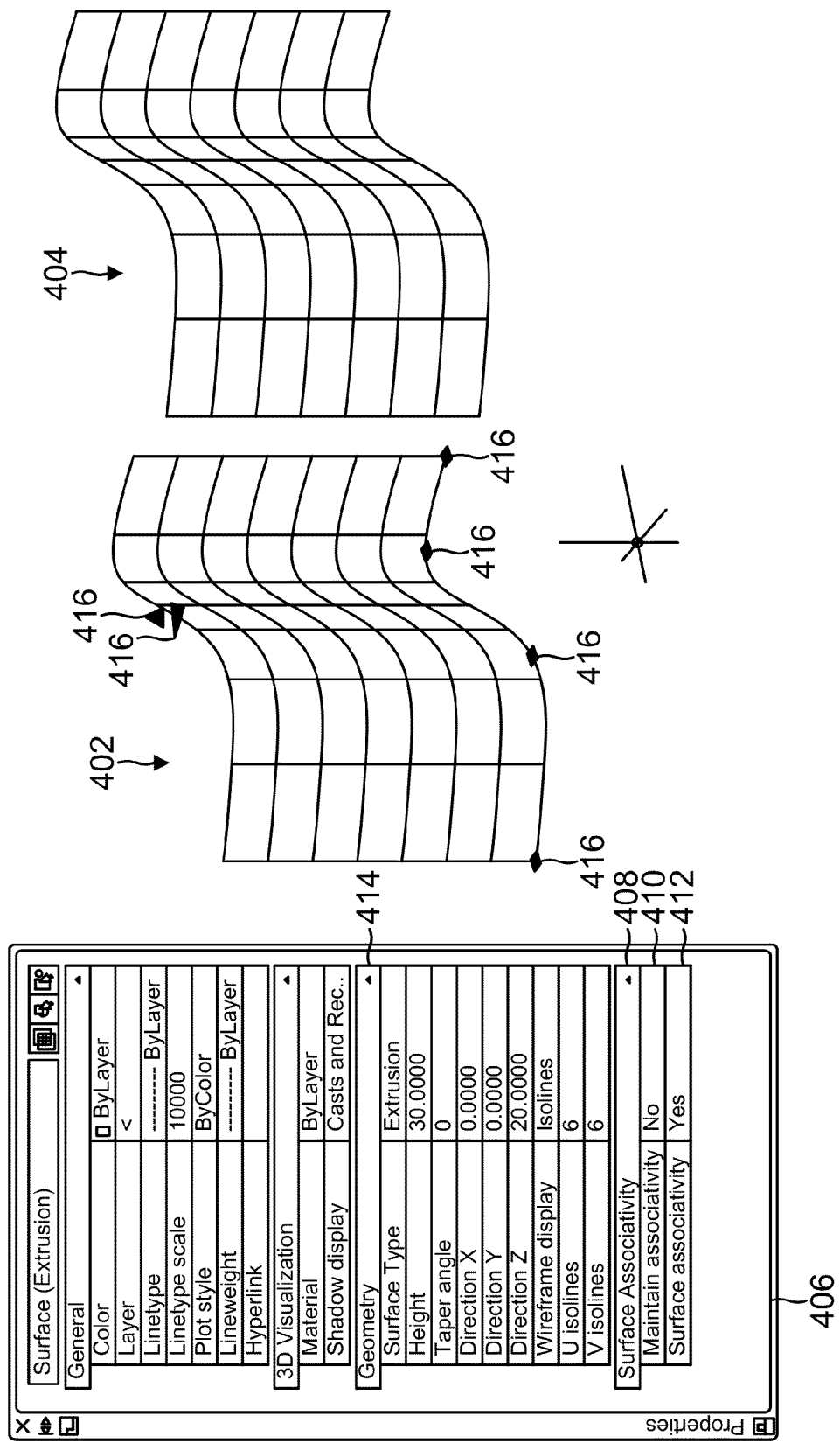
FIG. 4 illustrates a simple example of the passive associative functionality in accordance with one or more embodiments of the invention.

FIG. 4 illustrates a simple example of the passive associative functionality in accordance with one or more embodiments of the invention. FIG. 4 illustrates an extruded spline with no surface associativity (i.e., surface associativity is "off"). In this regard, image 402 illustrates the non-associative surface and its graphic affordances 416 when the surface 402 is selected. Image 404 illustrates the surface graphic representation when it is not selected (i.e., no graphic affordances 416 are illustrated).

The properties dialog box 406 is associated with a selected surface (e.g., surface 402). The properties dialog box 406 provides a surface associativity category 408 containing two fields: Maintain Associativity 410 and Surface Associativity 412. The Surface Associativity field 412 may also be known as "Show Associativity". The surface/show associativity field 412 can be set to "yes" or "no." When show associativity 412 is set to "yes" and an associative surface is selected, the system then displays the parent surface with a special graphic representation (e.g., some form of highlighting or other visually distinguishing representation). If show associativity 412 is set to "no," when a surface is selected, such a special graphic representation of the parent surface is not displayed and the parent is not visually distinguishable from the selected surface. Accordingly, the values for properties 410 and 412 indicate the current status of the surface associativity (e.g., active or inactive), and the status of visually representing the parent surface associated with the current selected surface respectively.

As an example, if the surface associativity button/icon 302 was selected when the surface was created (and had not been changed/broken), the property value for the maintain associativity property would indicate "yes." In FIG. 4, properties window 406 is based on surface 402 and reflects that surface associativity is off (via property 410). However, embodiments of the invention, without informing the user at the time of creation, still maintain passive associativity. Thus, the user can still select the extruded surface 402 and make changes to surface 402's height, taper angle and can also move/rotate the surface 402 in space without losing any of it properties. The ability to modify such properties is illustrated in property dialog window 406 via the geometry category 414 and further by the in-canvas manipulators/grips 416 displayed on surface 402. This is quite different from a surface modeler in which the surface would have lost all its parametric properties once the associative engine was disabled.

Figure 5:
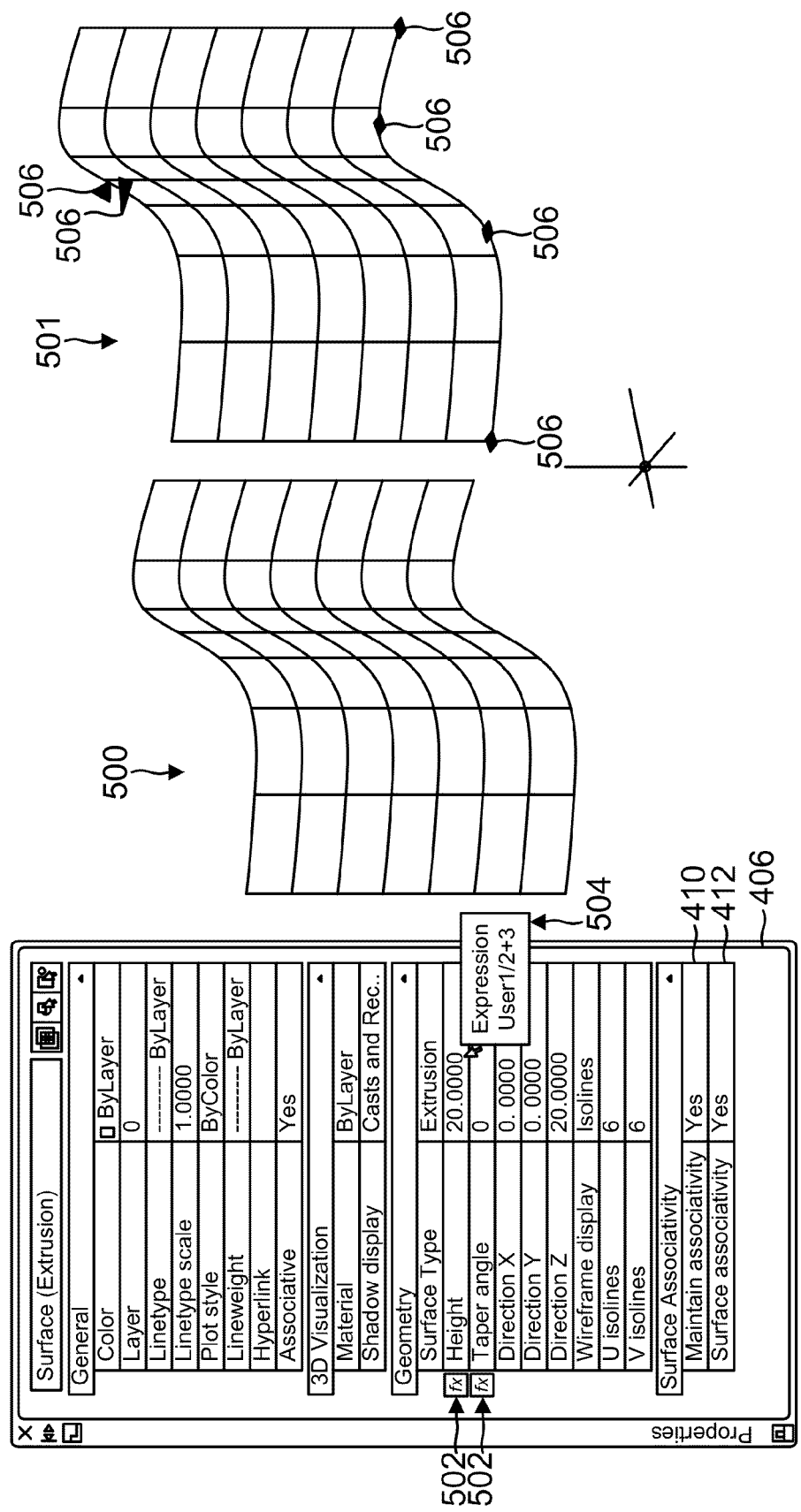
FIG. 5 illustrates an extruded surface (i.e., with surface associativity "on" in accordance with one or more embodiments of the invention.

FIG. 5 illustrates an unselected surface representation 500 and a selected surface representation 501 when the associativity is "on" (see property 410 in FIG. 5) in accordance with one or more embodiments of the invention. In other words, the user has actively elected to maintain surface associativity. The status of the surface associativity is reflected in properties dialog window 406 with a "yes" value for the maintain associativity property 410. In this case, where surface associativity is "on," the user can select the surface representation 501 and make changes to its height, taper angle, etc. In addition, the system may indicate that these object properties can be parametric and accept an expression/equation via a visual cue 502. The visual clue 502 may include an icon or glyph of a symbol representing a function. The final value may always be represented in the object properties 406, but a tooltip affordance 504 may be used/displayed to expose the underlying expression/equation.

The object in-canvas manipulators 506 which control the height, taper angle and general shape of the extruded surface may be displayed differently than when the associativity is "off" For example, the in-canvas manipulators 506 may be displayed in a different color, fill pattern, etc. Embodiments of the invention may provide such a visual clue (i.e., different display of the in-canvas manipulators 416 and 506) to inform the user that the surface 501 is being controlled by the associative engine.

Regardless of whether the value of the maintain associativity property 410 is "yes" or "no", the user can still pick and drag any of the in-canvas manipulators 416 and 506. However, if the maintain associativity property 410 has a value of "yes," and the user attempts to pick and drag an in-canvas manipulator 506, the system may inform the user that the grips 506 are controlled by the associative engine. At this point the user can either decide to cancel the edit operation or simply continue. FIG. 6 illustrates the dialog box 600 displayed to the user when a user attempts to modify a property that would cause a loss in associativity in accordance with one or more embodiments of the invention. As illustrated, the user can opt to continue in which case the surface will lose its associativity with the defining curve, surface, or parametric equation. Alternatively, the user can opt to cancel the operation and maintain surface associativity.

Figure 7:
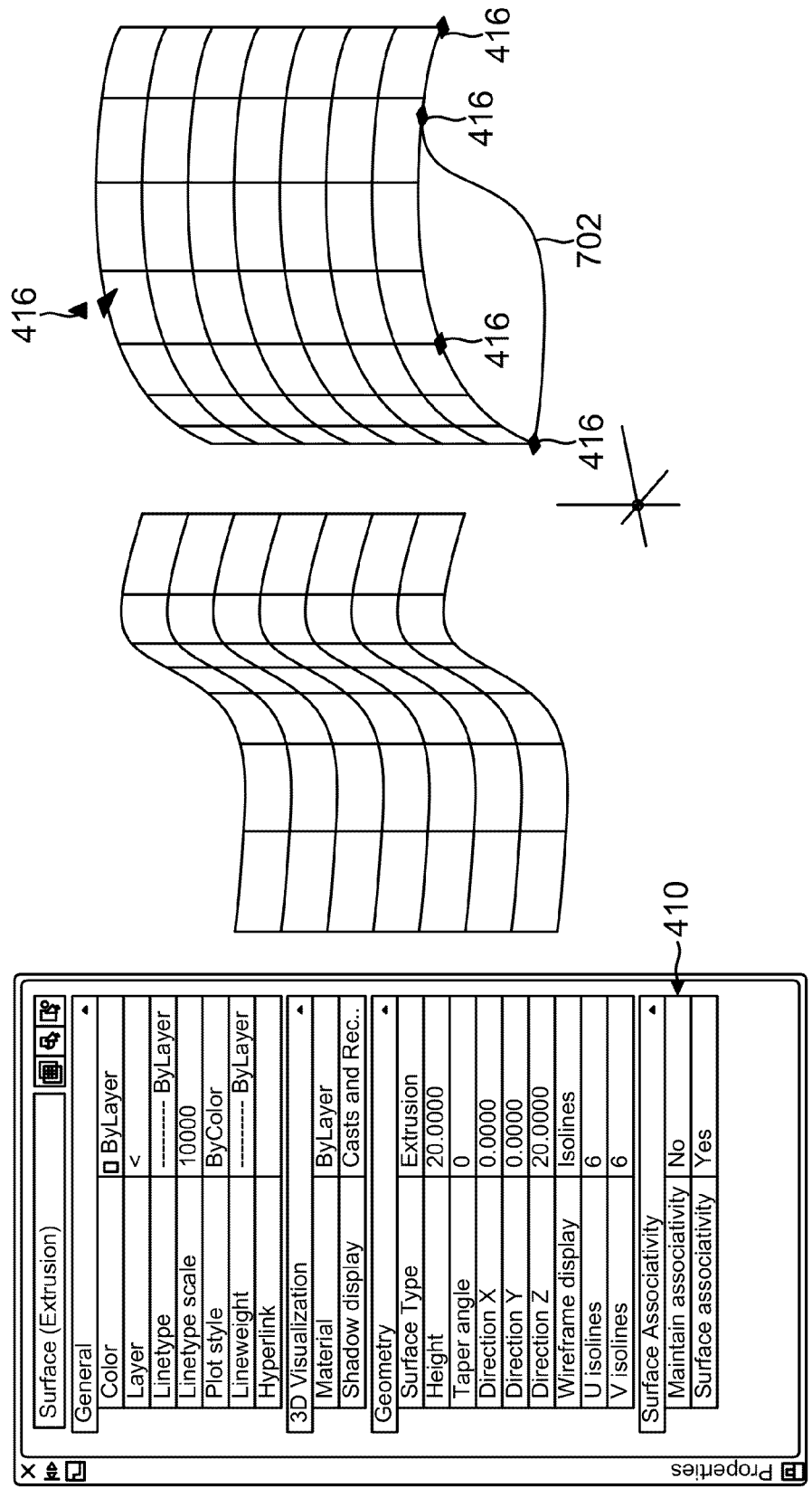
FIG. 7 illustrates an extruded surface once a user has selected to continue an edit operation (thereby breaking surface associativity) and updating the surface in accordance with one or more embodiments of the invention.

FIG. 7 illustrates the extruded surface once the user has selected to continue the edit operation (thereby breaking surface associativity) and updating the surface in accordance with one or more embodiments of the invention. Since the user has selected/elected to "continue" the drag operation in FIG. 6, the extruded surface is updated, the associative engine releases the surface and the normal in-canvas manipulators 416 (e.g., blue grips) are displayed. The surface 402 is still an "extruded" surface and it keeps all of it properties but the "maintain associativity" property 410 has been switched to "no."

It is also interesting to note that the original spline 702 that was constraining the extruded surface shape 402 has been exposed by modifying the once associative extruded surface.

The example of FIGS. 4-7 is quite simple and each surface type exposes a particular set of object properties which interact differently depending if the surface associativity engine is constraining them.

Surface Types Created from Other Surfaces/Edges

Figure 8:
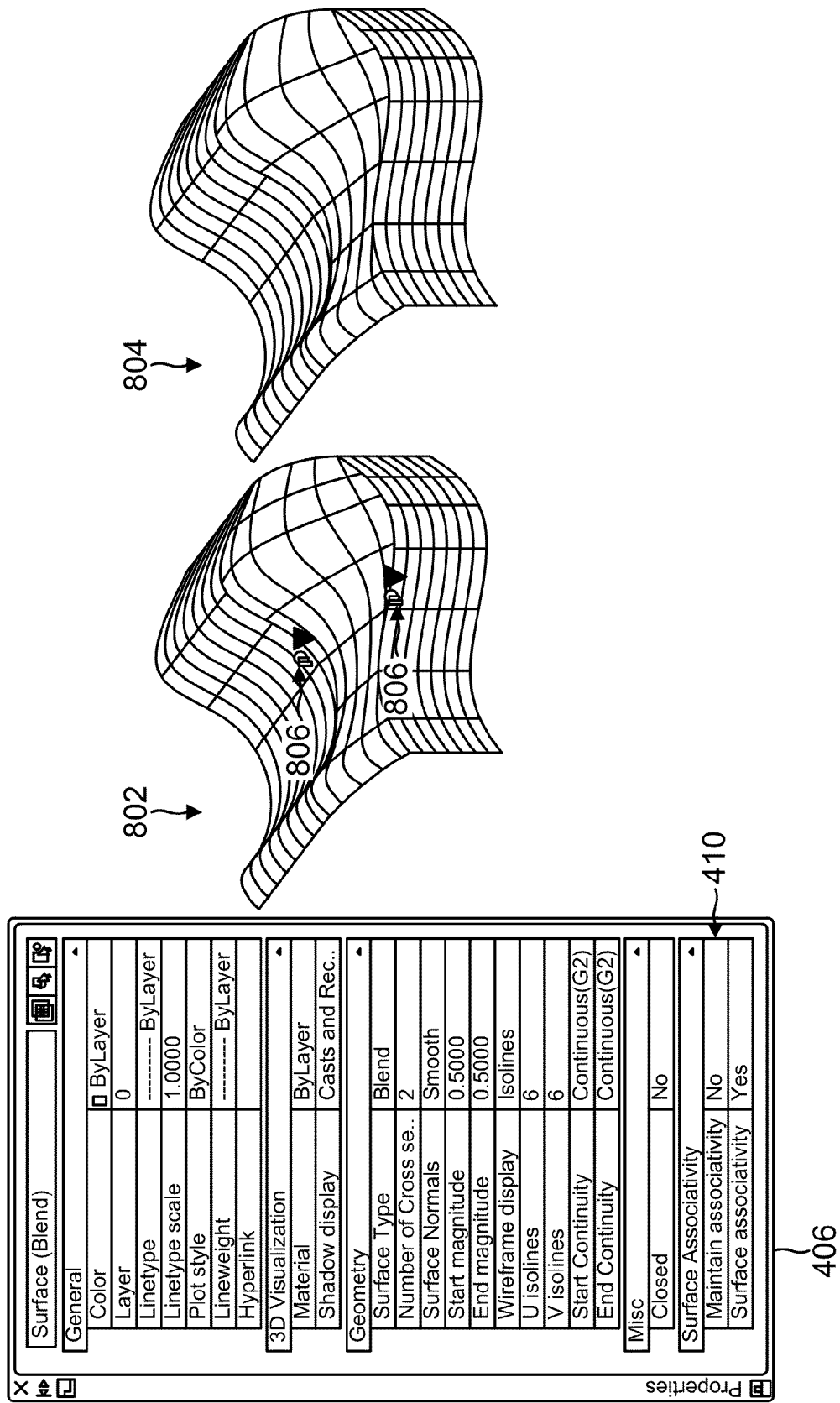
FIG. 8 illustrates a blend surface where surface associativity is set to "off" in accordance with one or more embodiments of the invention.

Some of the new surface object types depend on other surfaces to establish their continuity condition and their general shape. For example, a blend surface may be created between two existing surfaces. FIG. 8 illustrates a blend surface where surface associativity is set to "off" and the surface is selected 802 and not selected 804.

When surface associativity is "off" (as indicated in maintain associative property 410), the user can still select the blend surface and make changes to its continuity condition (G0, G1, G2) or bulge magnitude either via the Object Property manager (i.e., property window 406) or directly via the in-canvas manipulators 806. This is quite different from a surface modeler in which the surface would have lost all its parametric properties once the associative engine is disabled.

Figure 9:
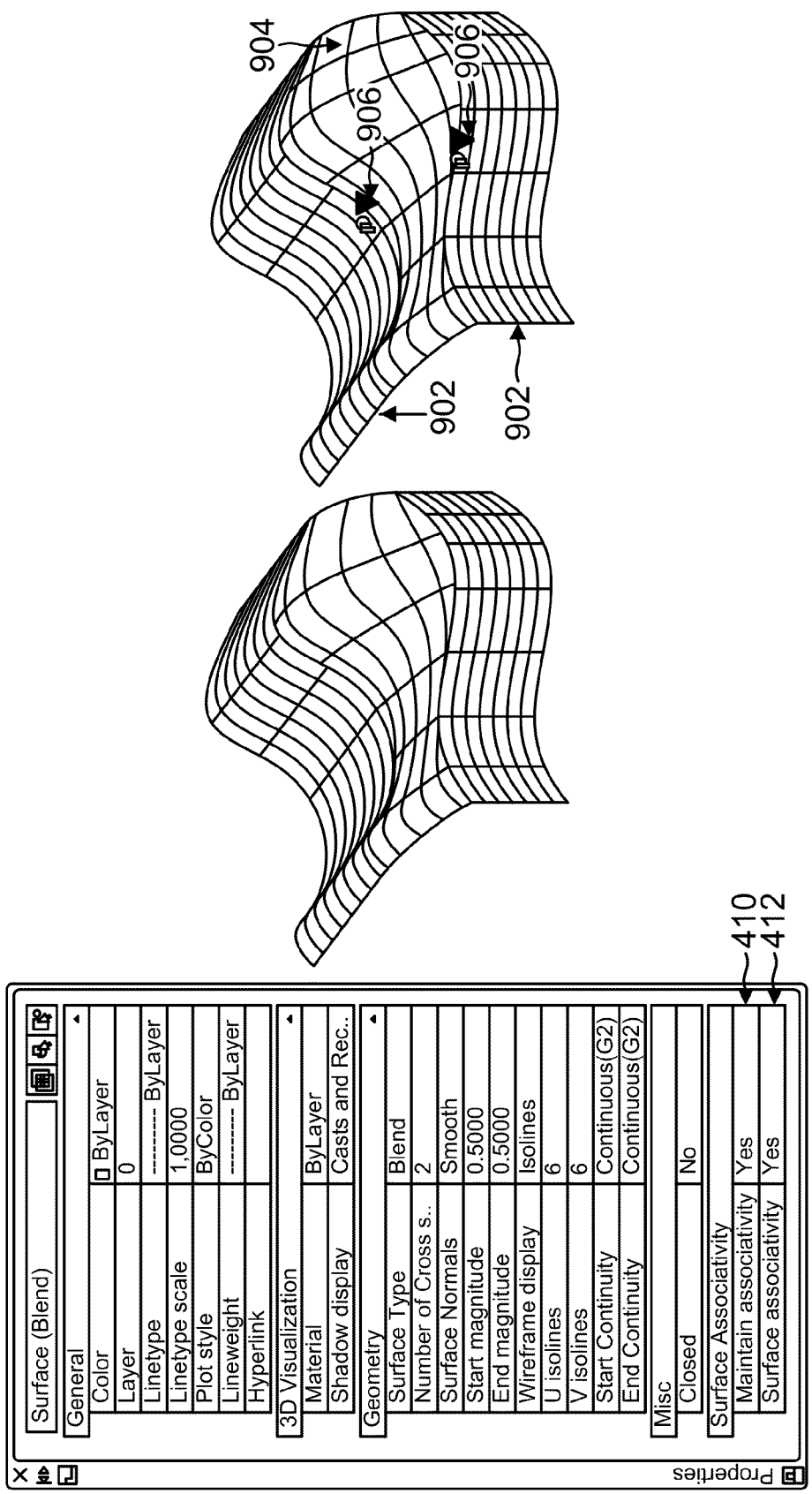
FIG. 9 illustrates a blend surface created with surface associativity on in accordance with one or more embodiments of the invention.

FIG. 9 illustrates a blend surface created with surface associativity on 410. In this case where surface associativity is "on" 410, the user can also display which other surfaces this blend surface depends on 412 and the system can display the dependency directly in the canvas 902 (e.g., using dashed lines or some other graphic affordance that visually distinguishes the input surfaces 902 from the blend surface 904). The user can also select the blend surface 904 and make changes to its continuity condition (G0, G1, G2) or bulge magnitude just like in the case of the non-associative surface (e.g., using in-canvas manipulators 906).

Figure 10:
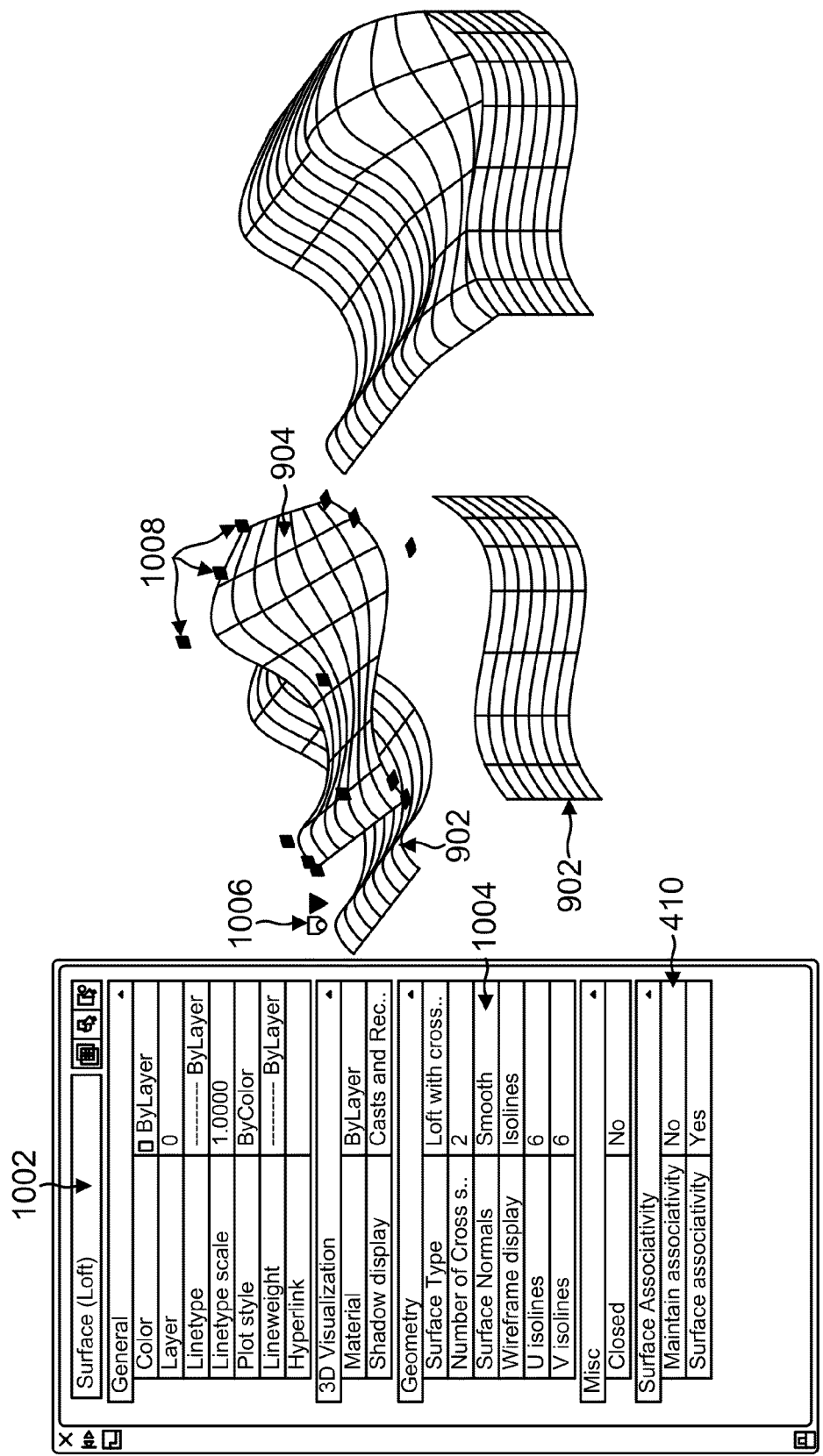
FIG. 10 illustrates a user moving a non-associative blend surface (i.e., a surface that only has passive associativity on) thereby converting the blend surface to a loft surface in accordance with one or more embodiments of the invention.

FIG. 10 illustrates a user moving a non-associative blend surface (i.e., a surface that only has passive associativity on) thereby converting the blend surface to a loft surface in accordance with one or more embodiments of the invention. Thus, surface associativity is "off" 410 and the user has elected to move the blend surface 904. The non-associative blend 904 needs the two existing surfaces 902 to support such properties as continuity. Because the blend surface 904 is not "touching" the originator surface the system internally copies the profile information and migrates the surface 904 to its closest object type; in this case a loft surface (as indicated in properties window at 1002). The user can still select the new surface 904 and make changes to its normal direction either via the object property manager 1004 or directly via the in-canvas manipulator 1006. Alternatively, the user can edit the grips points 1008 of the newly converted profiles. Such grip points 1008 may or may not live on the surface of blend surface 904.

In contrast, if surface associativity is "on", and the user moves one of the existing surfaces that was used to generate the associative blend (i.e. an input surface), the system automatically updates the position and shape of the blend surface. FIG. 11 illustrates the movement of an existing input surface 902 (left) and the resulting updated blend surface 904 (right) when surface associativity is "on" in accordance with one or more embodiments of the invention.

In contrast to FIG. 11, when surface associativity is "on", and the user attempts to move the associative blend surface 904 itself (rather than the input surfaces 902), the dialog window 600 of FIG. 6 is displayed. The user can still pick and drag that associative blend surface 904, but the system will inform the user that this surface 904 is controlled by the associative engine. At this point, the user can either decide to cancel the edit operation or simply continue.

Figure 12:
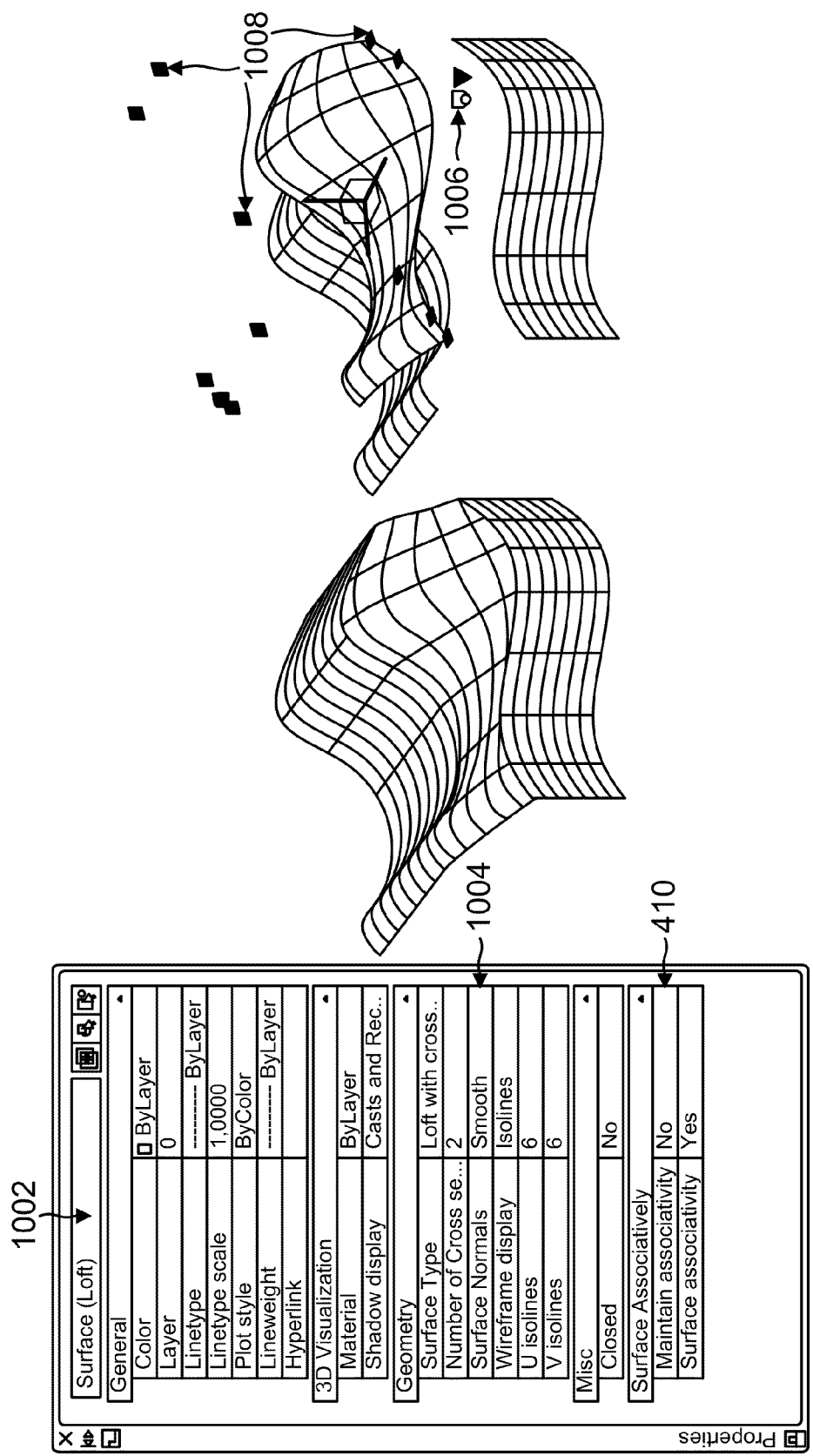
FIG. 12 illustrates a resulting update to a blend surface when a user elects to continue a move/drag operation thereby removing an association with input surfaces in accordance with one or more embodiments of the invention.

If the user elects to continue the move/drag operation (via dialog window 600), the blend surface is updated with the associative engine releasing the surface (as indicated at 410) as illustrated in FIG. 12. Because the blend surface 904 is not "touching" the originator/input surface 902 the system internally copies the profile information and migrates the surface 904 to its closest object type; in this case a loft surface (as indicated at 1002). The user can still select the new surface 904 and make changes to its normal direction either via the object property manager 1004 or directly via the in-canvas manipulators 1006. The user can also edit the grips points 1008 of the newly converted profiles and may live on the surface of surface 904.

In view of the above, it can be seen that regardless of the status of the associativity, the same user graphical affordances are presented and may be used to edit the model. Accordingly, the user does not need to learn two different systems of interaction. Further, embodiments of the invention may automatically convert/translate a surface to the appropriate shape (e.g., blend surface to a loft or NURBS surface [as indicated at 1002]) based on which element/object of a model is moved/edited. Such a transition between different shape behaviors/status provides a frictionless environment for the user who doesn't need to manually modify and change surfaces.

Associative Surface to Non-Associative Migration Path

The table below illustrates the transition/migration path from an associative surface to a non-associative surface depending on the actions of the user, the surface object type, and the surface associativity setting. The first column illustrates the starting surface object type. The second column illustrates the affect on the surface object (i.e., the resulting surface object type) when the surface associativity is off and the surface loses connection with the defining profile or originator surface. The third column illustrates the affect on the surface object (i.e., the resulting surface object type) when the surface associativity is on and the surface is moved from its original location. As used herein "none associative" means that the new resulting surface will have "Surface Associativity" set to "no."

| Surface Object Type | SURFACE ASSOCIATIVITY = OFF and surface looses connection with defining profile or originator surface | SURFACE ASSOCIATIVITY = ON and surface is moved from original location |
|---|---|---|
| Surface (NURBS) | N/A | N/A |
| Surface (extrusion) | No impact | Surface (extrusion) none associative |
| Surface (Loft) | No impact on object type; profile coming from connected surface will be converted in defining profiles | Surface (Loft) none associative; profile coming from connected surface will be converted in defining profiles |
| Surface (Planar) | No impact | Surface (Planar) none associative |
| Surface (Revolve) | No impact | Surface (Revolve) none associative |
| Surface (sweep) | No impact | Surface (sweep) none associative |
| Surface (Blend) | Surface (loft) none associative; profile coming from connected surfaces will be converted in defining profiles | Surface (loft) none associative; profile coming from connected surfaces will be converted in defining profiles |
| Surface (network) | Surface (loft) none associative; profile coming from connected surfaces will be converted in defining profiles | Surface (loft) none associative; profile coming from connected surfaces will be converted in defining profiles |
| Surface (Fillet) | Surface (generic) none associative | Surface (generic) none associative |
| Surface (Extend) | Surface (generic) none associative | Surface (generic) none associative |
| Surface (Offset) | Surface (generic) none associative | Surface (generic) none associative |
| Surface (Patch) | Surface (generic) none associative | Surface (generic) none associative |

Surface Properties that can be Controlled Via an Equation or Expression

The table below illustrates the surface properties that can be controlled via an equation or expression in accordance with one or more embodiments of the invention.

| Surface Type | Properties that accept expression and user variable input |
|---|---|
| Surface (NURBS) | No property |
| Surface (extrusion) | Height property<br>Taper property<br>Profile can accept constrain 2D geometry |
| Surface (Loft) | Bulge magnitude property for each edge<br>Profile can accept constrain 2D geometry |
| Surface (Planar) | Profile can accept constrain 2D geometry |
| Surface (Revolve) | Revolve angle property<br>Profile can accept constrain 2D geometry |
| Surface (Offset) | offset distance property |
| Surface (Extend) | extension distance property |
| Surface (sweep) | Profile can accept constrain 2D geometry |
| Surface (Blend) | Bulge magnitude property for each edge |
| Surface (network) | Bulge magnitude property for each edge<br>Profile can accept constrain 2D geometry |
| Surface (Patch) | Bulge magnitude property<br>constrain Profile can accept constrain 2D geometry |
| Surface (Fillet) | Fillet Radius property |
| Surface (Chamfer) | First distance from edge property<br>Second distance from edge property |

Logical Flow

Figure 13:
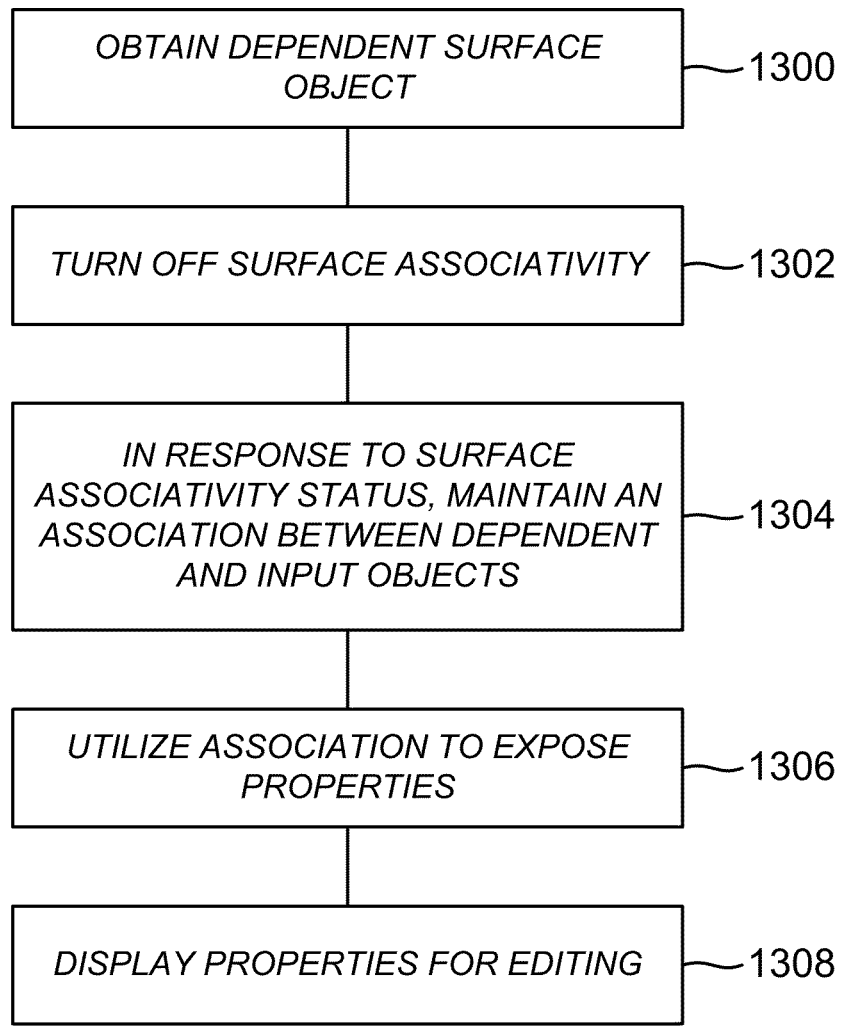
FIG. 13 is a flow chart illustrating the logical flow for editing surface objects in a computer-implemented surface modeler in accordance with one or more embodiments of the invention.

FIG. 13 is a flow chart illustrating the logical flow for editing surface objects in a computer-implemented surface modeler in accordance with one or more embodiments of the invention.

At step 1300, a dependent surface object having one or more properties is obtained. The dependent surface object is dependent on one or more input objects. Such a dependent surface object may be an extruded surface object and the properties (to be edited) and/or the input objects may be parametric properties/equations. Such an extruded dependent surface object may then be selected and the parametric properties/equations may be modified without removing the association. Another example of a dependent surface object is that of a blend surface that is a blend of two or more input surface objects that serve to establish a continuity condition and a general shape of the blend surface. The blend surface may then be selected and the continuity condition can be modified (e.g., via an object property manager or directly via an in-canvas manipulator) (e.g., without removing/affecting the association). However, if second user input modifies the blend surface in a manner that results in a loss of continuity between the blend surface and one of the input surface objects, (in response) the blend surface may be migrated into a different object type that is non-associative (e.g., a loft surface, NURBS surface, etc.).

At step 1302, first user input indicating that a surface associativity for the dependent surface object is "off" is received (e.g., by selecting an icon/button when creating or after selecting the dependent surface object).

At step 1304, in response to the receiving of the user input, an association between the dependent surface object and the input objects is maintained. In other words, even though the user has elected to turn "off" the associativity, the association is still maintained.

At step 1306, the association is used to expose the one or more properties of the dependent surface object.

At step 1308, the one or more properties are displayed, on a display device, for editing by the user. Such utilizing and displaying at step 1306 may include receiving second user input for a user operation modifying one of the input objects. In response, a visual clue (e.g., dialog box/window) may be displayed indicating that the dependent surface object is controlled by an associative engine (e.g., that one or more surfaces are associated with a defining curve, surface, or a parametric equation). The visual clue may also offer an option to: (1) continue the user operation and no longer maintain the association; or (2) cancel the user operation and maintain the association. Third user input may indicate the selection of option (1) (to continue the operation) after which the input objects may be modified based on the second user input and the association may be removed.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

Unique aspects of embodiments of the invention may include one or more of the following:

1. Surfaces keep their creation properties even if the associative engine is off;
2. The associative engine "doing" is not exposed through a tree or graph representation but directly exposed in a Surface type object taxonomy;
3. Surface creation properties can be edited when the associative engine is off;
4. The user is not rigidly constrained to the surface associative engine and can make edits to the surface;
5. A consistent graphical language is exposed (for the surface objects) that provides information on the associative state of any surface;
6. The user can have surfaces that are using the associative engine and other surfaces that are not using the associative engine interact seamlessly in the same environment; and
7. A visual cue in the canvas informs the user that a specific property(ies) of an object is being controlled by an equation or expression.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for editing surface objects in a computer implemented surface modeler, comprising:
   (a) obtaining, in the computer-implemented surface modeler, a dependent surface object having one or more properties, wherein:
      (1) the dependent surface object is dependent on one or more input objects;
      (2) the dependent surface object comprises a blend surface; and
      (3) the one or more input objects comprise two or more input surface objects that establish a continuity condition and a general shape of the dependent surface object;
   (b) receiving first user input indicating that a surface associativity for the dependent surface object is off;
   (c) in response to the receiving, maintaining an association between the dependent surface object and the one or more input objects;
   (d) utilizing the association to expose the one or more properties of the dependent surface object; and
   (e) displaying, on a display device, the one or more properties for editing by the user;
   wherein the utilizing and displaying comprises:
   receiving second user input modifying the blend surface in a manner resulting in a loss of continuity between the blend surface and one of the two or more input surface objects; and
   in response to the second user input, migrating the blend surface into a different object type that is non-associative.

2. The method of claim 1, further comprising:
   (a) receiving second user input for a user operation modifying one or more of the one or more input objects;
   (b) displaying a visual clue:
      (i) indicating that the dependent surface object is controlled by an associative engine; and
      (ii) offering an option to:
         (1) continue the user operation and no longer maintain the association; or
         (2) cancel the user operation and maintain the association;

(c) accepting third user input via the visual clue to continue the user operation; and
(d) in response to the third user input, modifying the one or more input objects based on the second user input and removing the association.

3. The method of claim 1, wherein:
the dependent surface object comprises an extruded surface object; and
the one or more properties comprise one or more parametric properties.

4. The method of claim 3, wherein the utilizing and displaying comprises:
selecting the extruded surface object; and
modifying the one or more parametric properties.

5. The method of claim 1, wherein the utilizing and displaying comprises:
selecting the blend surface; and
modifying the continuity condition via an object property manager or directly via an in-canvas manipulator.

6. An apparatus for editing surface objects in a computer system comprising:
(a) a computer having a memory;
(b) a surface modeler application executing on the computer, wherein the surface modeler application is configured to:
(a) obtain a dependent surface object having one or more properties, wherein:
(1) the dependent surface object is dependent on one or more input objects;
(2) the dependent surface object comprises a blend surface; and
(3) the one or more input objects comprise two or more input surface objects that establish a continuity condition and a general shape of the dependent surface object;
(b) receive first user input indicating that a surface associativity for the dependent surface object is off;
(c) in response to the receiving, maintain an association between the dependent surface object and the one or more input objects;
(d) utilize the association to expose the one or more properties of the dependent surface object; and
(e) display, on a display device communicatively coupled to the computer, the one or more properties for editing by the user;
wherein the surface modeler is configured to utilize and display by:
receiving second user input modifying the blend surface in a manner resulting in a loss of continuity between the blend surface and one of the two or more input surface objects; and
in response to the second user input, migrating the blend surface into a different object type that is non-associative.

7. The apparatus of claim 6, further comprising:
(a) receiving second user input for a user operation modifying one or more of the one or more input objects;
(b) displaying a visual clue:
(i) indicating that the dependent surface object is controlled by an associative engine; and
(ii) offering an option to:
(1) continue the user operation and no longer maintain the association; or
(2) cancel the user operation and maintain the association;
(c) accepting third user input via the visual clue to continue the user operation; and
(d) in response to the third user input, modifying the one or more input objects based on the second user input and removing the association.

8. The apparatus of claim 6, wherein:
the dependent surface object comprises an extruded surface object; and
the one or more properties comprise one or more parametric properties.

9. The apparatus of claim 8, wherein the surface modeler application is configured to utilize and display by:
selecting the extruded surface object; and
modifying the one or more parametric properties.

10. The apparatus of claim 6, wherein the surface modeler application is configured to utilize and display by:
selecting the blend surface; and
modifying the continuity condition via an object property manager or directly via an in-canvas manipulator.

11. A computer readable non-transitory storage medium encoded with computer program instructions which when accessed by a computer cause the computer to load the program instructions to a memory therein creating a special purpose data structure causing the computer to operate as a specially programmed surface modeling computer, executing a method of editing surface objects, comprising:
(a) obtaining, in the specially programmed surface modeling computer, a dependent surface object having one or more properties, wherein:
(i) the dependent surface object is dependent on one or more input objects;
(ii) the dependent surface object comprises a blend surface; and
(iii) the one or more input objects comprise two or more input surface objects that establish a continuity condition and a general shape of the dependent surface object;
(b) receiving, in the specially programmed surface modeling computer, first user input indicating that a surface associativity for the dependent surface object is off;
(c) in response to the receiving, maintaining, in the specially programmed surface modeling computer, an association between the dependent surface object and the one or more input objects;
(d) utilizing, in the specially programmed surface modeling computer, the association to expose the one or more properties of the dependent surface object; and
(e) displaying, on a display device communicatively coupled to the specially programmed surface modeling computer, the one or more properties for editing by the user;
wherein the utilizing and displaying comprises:
receiving, in the specially programmed surface modeling computer, second user input modifying the blend surface in a manner resulting in a loss of continuity between the blend surface and one of the two or more input surface objects; and
in response to the second user input, migrating, in the specially programmed surface modeling computer, the blend surface into a different object type that is non-associative.

12. The computer readable non-transitory storage medium of claim 11, further comprising:
(a) receiving, in the specially programmed surface modeling computer, second user input for a user operation modifying one or more of the one or more input objects;
(b) displaying, via the specially programmed surface modeling computer, a visual clue:

(i) indicating that the dependent surface object is controlled by an associative engine; and
(ii) offering an option to:
(1) continue the user operation and no longer maintain the association; or
(2) cancel the user operation and maintain the association;
(c) accepting, in the specially programmed surface modeling computer, third user input via the visual clue to continue the user operation; and
(d) in response to the third user input, modifying, in the specially programmed surface modeling computer, the one or more input objects based on the second user input and removing the association.

13. The computer readable non-transitory storage medium of claim 11, wherein:
the dependent surface object comprises an extruded surface object; and
the one or more properties comprise one or more parametric properties.

14. The computer readable non-transitory storage medium of claim 13, wherein the utilizing and displaying comprises:
selecting, in the specially programmed surface modeling computer, the extruded surface object; and
modifying, in the specially programmed surface modeling computer, the one or more parametric properties.

15. The computer readable non-transitory storage medium of claim 11, wherein the utilizing and displaying comprises:
selecting, in the specially programmed surface modeling computer, the blend surface; and
modifying, in the specially programmed surface modeling computer, the continuity condition via an object property manager or directly via an in-canvas manipulator.

* * * * *